United States Patent
Rhim

(10) Patent No.: US 10,579,826 B2
(45) Date of Patent: Mar. 3, 2020

(54) METHOD OF TRANSMITTING ANONYMOUS MESSAGE AND MESSAGE TRANSMISSION SYSTEM USING THE SAME

(71) Applicant: Samsung Electronics Co., Ltd, Suwon-si, Gyeonggi-do (KR)

(72) Inventor: Eun-hee Rhim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 681 days.

(21) Appl. No.: 14/330,215

(22) Filed: Jul. 14, 2014

(65) Prior Publication Data

US 2015/0081815 A1    Mar. 19, 2015

(30) Foreign Application Priority Data

Sep. 17, 2013 (KR) .................. 10-2013-0111678

(51) Int. Cl.
  G06F 21/62      (2013.01)
  H04L 12/58      (2006.01)
  H04L 29/06      (2006.01)

(52) U.S. Cl.
  CPC .......... *G06F 21/6254* (2013.01); *H04L 51/28* (2013.01); *H04L 63/0421* (2013.01);
  (Continued)

(58) Field of Classification Search
  CPC ... H04L 5/00–0001; H04L 9/00; H04L 9/006; H04L 9/0861; H04L 9/088; H04L 9/0891; H04L 12/00; H04L 12/16; H04L 12/1813; H04L 12/40; H04L 12/40104; H04L 41/00; H04L 41/02; H04L 41/0246;
  (Continued)

(56) References Cited

U.S. PATENT DOCUMENTS 5,862,223 A * 1/1999 Walker .......... G06Q 10/063112
                                                    705/50
5,884,246 A * 3/1999 Boucher .............. G06F 17/289
                                                    704/2
(Continued)

FOREIGN PATENT DOCUMENTS

KR    10-2005-0094372    9/2005
KR    10-2010-0134188    12/2010
KR    10-2011-0067977    6/2011

OTHER PUBLICATIONS

Indika—Difference Between Encoding and Encryption—Jul. 7, 2011.*

(Continued)

*Primary Examiner* — Brian J. Gillis
*Assistant Examiner* — Boris D Grijalva Lobos
(74) *Attorney, Agent, or Firm* — Staas & Halsey LLP

(57) ABSTRACT

An anonymous message transmission method and a message transmission system using the same. In an anonymous message transmission method of a message transmission system, a terminal device transmits a message created by a user to a server when the terminal device is set to an anonymous transmission mode and receives a message transmission command from the user, and the server generates an anonymous message by eliminating user information included in the message, and transmits the anonymous message to an external terminal device.

21 Claims, 7 Drawing Sheets

(52) U.S. Cl.
CPC ............... *G06F 2221/2137* (2013.01); *G06F 2221/2143* (2013.01)

(58) Field of Classification Search
CPC ... H04L 41/026; H04L 41/0266; H04L 45/00; H04L 45/24; H04L 51/00; H04L 51/04; H04L 51/06–08; H04L 51/12; H04L 51/18; H04L 51/38; H04L 63/00; H04L 63/04; H04L 63/0421; G06F 21/00; G06F 21/60; G06F 21/606; G06F 21/62; G06F 21/6254; G06F 2121/2137; G06F 21/2143
See application file for complete search history.

(56) References Cited

U.S. PATENT DOCUMENTS

| | | | | |
|---|---|---|---|---|
| 5,884,270 | A * | 3/1999 | Walker | G06Q 10/1053 379/93.12 |
| 5,958,005 | A * | 9/1999 | Thorne | G06Q 10/107 380/51 |
| 5,961,593 | A * | 10/1999 | Gabber | G01M 13/021 370/329 |
| 6,023,510 | A * | 2/2000 | Epstein | G06Q 20/383 380/285 |
| 6,266,704 | B1 * | 7/2001 | Reed | H04L 45/00 709/238 |
| 6,389,533 | B1 * | 5/2002 | Davis | H04L 63/0407 713/151 |
| 6,442,687 | B1 * | 8/2002 | Savage | H04L 63/0407 709/203 |
| 6,591,291 | B1 * | 7/2003 | Gabber | G06Q 10/107 370/393 |
| 6,608,888 | B2 * | 8/2003 | Bedingfield | H04L 12/585 379/201.11 |
| 7,174,158 | B2 * | 2/2007 | Cini | H04L 63/0407 455/411 |
| 7,181,017 | B1 * | 2/2007 | Nagel | H04L 9/0825 380/282 |
| 7,188,358 | B1 * | 3/2007 | Hisada | H04L 51/12 709/223 |
| 7,194,760 | B2 * | 3/2007 | Nordman | H04L 29/12009 726/3 |
| 7,219,131 | B2 * | 5/2007 | Banister | G06Q 10/107 709/202 |
| 7,234,059 | B1 * | 6/2007 | Beaver | H04L 9/0833 380/283 |
| 7,394,804 | B2 * | 7/2008 | Miyata | H04L 29/06027 370/352 |
| 7,546,117 | B2 * | 6/2009 | Lewis | H04M 3/42042 455/411 |
| 7,590,245 | B1 * | 9/2009 | Levitan | H04L 45/00 380/255 |
| 7,616,559 | B2 * | 11/2009 | Thompson | H04L 1/22 370/223 |
| 7,889,726 | B2 * | 2/2011 | Poikelka | H04M 3/42008 370/389 |
| 8,014,757 | B1 * | 9/2011 | Lim | H04L 51/38 455/412.1 |
| 8,693,377 | B1 * | 4/2014 | Hazy | H04M 3/5191 370/270 |
| 8,731,586 | B2 * | 5/2014 | Schmidt | H04L 12/585 455/411 |
| 8,904,036 | B1 * | 12/2014 | Reynolds | H04L 12/4633 380/28 |
| 8,914,410 | B2 * | 12/2014 | Hannel | H04L 63/105 707/776 |
| 9,027,092 | B2 * | 5/2015 | Doora PrabhuSwamy | G06F 21/6218 705/51 |
| 9,584,517 | B1 * | 2/2017 | Roth | H04L 63/10 |
| 2002/0095596 | A1 * | 7/2002 | Williams | G06F 21/6218 726/26 |
| 2002/0099832 | A1 * | 7/2002 | Yaegerman | H04L 63/0281 709/228 |
| 2002/0110227 | A1 * | 8/2002 | Bedingfield | H04L 12/585 379/88.19 |
| 2003/0046144 | A1 * | 3/2003 | Clark | G06Q 50/34 705/12 |
| 2003/0046534 | A1 * | 3/2003 | Alldredge | G06Q 20/02 713/153 |
| 2003/0182581 | A1 * | 9/2003 | Isozaki | G06Q 20/3674 726/28 |
| 2004/0103205 | A1 * | 5/2004 | Larson | H04L 29/12216 709/229 |
| 2004/0196842 | A1 * | 10/2004 | Dobbins | H04L 12/2856 370/389 |
| 2004/0205173 | A1 * | 10/2004 | Hall | H04L 51/28 709/223 |
| 2005/0152378 | A1 * | 7/2005 | Bango | H04L 47/10 370/400 |
| 2006/0106914 | A1 * | 5/2006 | Plow | H04L 51/12 709/206 |
| 2007/0054678 | A1 * | 3/2007 | Doulton | H04M 3/42382 455/466 |
| 2007/0083604 | A1 * | 4/2007 | Zimman | G06F 21/32 709/207 |
| 2007/0129966 | A1 * | 6/2007 | Walker | G06Q 10/10 705/321 |
| 2008/0070697 | A1 * | 3/2008 | Robinson | A63F 13/12 463/42 |
| 2008/0196098 | A1 * | 8/2008 | Cottrell | H04L 63/0414 726/12 |
| 2008/0301076 | A1 * | 12/2008 | Timmins | G06Q 10/06 706/46 |
| 2008/0301537 | A1 * | 12/2008 | Isono | H03M 13/091 714/807 |
| 2009/0156166 | A1 * | 6/2009 | Van Der Weide | H04W 88/184 455/411 |
| 2010/0325441 | A1 * | 12/2010 | Laurie | G06F 21/31 713/185 |
| 2011/0010425 | A1 * | 1/2011 | Bernatz | G06Q 10/107 709/206 |
| 2011/0170405 | A1 * | 7/2011 | Beecroft | H04L 49/557 370/217 |
| 2012/0163581 | A1 * | 6/2012 | Lieber | H04L 9/0894 380/28 |
| 2012/0166582 | A1 * | 6/2012 | Binder | H04L 63/18 709/217 |
| 2013/0070672 | A1 * | 3/2013 | McFarland | H04L 65/1069 370/328 |
| 2013/0159836 | A1 * | 6/2013 | Ferraro | G06Q 10/00 715/234 |
| 2013/0218983 | A1 * | 8/2013 | Richard | H04W 12/02 709/206 |
| 2013/0297330 | A1 * | 11/2013 | Kamen | G06F 19/323 705/2 |
| 2014/0046792 | A1 * | 2/2014 | Ganesan | G06Q 30/0611 705/26.4 |
| 2014/0053244 | A1 * | 2/2014 | Raman | G06F 21/6263 726/4 |
| 2014/0101774 | A1 * | 4/2014 | Armington | G06F 21/60 726/26 |
| 2014/0115710 | A1 * | 4/2014 | Hughes | G06F 21/6245 726/26 |
| 2014/0136617 | A1 * | 5/2014 | Singer | H04L 51/32 709/204 |
| 2015/0058957 | A1 * | 2/2015 | Halliday | H04W 4/02 726/7 |
| 2015/0281435 | A1 * | 10/2015 | Charlson | H04M 3/42059 379/142.06 |
| 2015/0304300 | A1 * | 10/2015 | Bender | H04L 12/1895 726/4 |

(56) References Cited

U.S. PATENT DOCUMENTS

2016/0294793 A1* 10/2016 Larson ............... H04L 63/0485
2016/0359728 A1* 12/2016 Ficara ................ H04L 45/14

OTHER PUBLICATIONS smsspoofing.com—Everything You Ever Wanted to Know About SMS Spoofing—2011.*
Anonymous Remailers—Manage—Jan. 2, 1999.*
Instructions on how to use the Xandra Remailer—angelfire.com—2003.*
Leibaschoff—How to Send E-mails with Exchange Using a Different "From" Address—Nov. 6, 2007.*
Noteboom—How Can I Send Anonymous Email—Ask Leo!—Jan. 9, 2005.*
Remailer Networks—Jun. 12, 2003—Palfrader et al.*
Vanish.org—Anonymity using Remailers—2006.*
Appelbaum—Using mixmaster to send anonymous email—2010.*
Jain—A secure multipath anonymous routing technique—2011.*
Shrenuj, "How to Send an Email to Self (Yourself) without typing the actual one" Jul. 23, 2011, Gmail Help.*
Korean Office Action dated Aug. 19, 2019 in Korean Patent Application No. 10-2013-0111678.

* cited by examiner

METHOD OF TRANSMITTING ANONYMOUS MESSAGE AND MESSAGE TRANSMISSION SYSTEM USING THE SAME

CROSS-REFERENCE TO RELATED APPLICATIONS

This application claims priority from Korean Patent Application No. 10-2013-0111678, filed on Sep. 17, 2013, in the Korean Intellectual Property Office, the disclosure of which is incorporated herein by reference in its entirety.

BACKGROUND OF THE INVENTION

1. Field of the Invention

Apparatuses and methods consistent with the present inventive concept relate to a method of transmitting an anonymous message and a message transmission system using the same, and more particularly, to a method of transmitting an anonymous message for which anonymity is guaranteed, and a message transmission system using the same.

2. Description of the Related Art

These days, there are many kinds of methods of transmitting a message. For example, one-to-one text message transmission is possible using a smart phone, and message transmission is also possible over a social network service (SNS), such as Twitter.

In the related-art message transmission method, a message includes diverse additional information such as user identification (ID), a user name, contact information, and a user's location as well as message text.

Accordingly, when a message needs to be transmitted anonymously (for example, when a user wishes to anonymously transmit a message, when a correspondent in a dangerous location transmits a message, or when a user wishes to tell a secret that is kept to himself), user information is exposed and cannot be protected by the related-art message transmission method.

SUMMARY OF THE INVENTION

Exemplary embodiments of the present inventive concept overcome the above disadvantages and other disadvantages not described above. Also, the present inventive concept is not required to be limited to only overcoming the disadvantages described above, and an exemplary embodiment of the present inventive concept may apply to features not directed to the problems described above.

The present inventive concept provides an anonymous message transmission method capable of transmitting a message to an external terminal device while eliminating user information from the message so as to guarantee anonymity, and a message transmission system using the method.

The present inventive concept also provides a system to perform the operations of the method.

Additional features and utilities of the present general inventive concept will be set forth in part in the description which follows and, in part, will be obvious from the description, or may be learned by practice of the general inventive concept.

Exemplary embodiments of the present inventive concept provide an anonymous message transmission method of a message transmission system, the method including: at a terminal device, transmitting a message created by a user to a server when the terminal device is set to an anonymous transmission mode and receives a message transmission command from the user, at the server, generating an anonymous message by eliminating user information included in the message; and, at the server, transmitting the anonymous message to an external terminal device.

In the transmitting operation, the message may be divided into a plurality of segments and be transmitted to the server over a plurality of paths, and the server may restore the segments of the message transmitted over the plurality of paths.

In the transmitting operation, each of the segments may be encoded and be transmitted to the server, and the server may decode each of the encoded segments, and restore the decoded segments of the message.

The method may further include at the terminal device, displaying a user interface (UI) to set a message transmission mode when a predetermined user command is input, and, at the terminal device, changing the message transmission mode of the terminal device into the anonymous transmission mode when a user command to change the message transmission mode into the anonymous transmission mode is input through the UI.

The anonymous transmission mode may include a first anonymous transmission mode to transmit the message to the external terminal device using anonymous identification (ID), and a second anonymous transmission mode to transmit the message back to the terminal device using the anonymous ID.

When the terminal device is in the first anonymous transmission mode, the generating operation may include eliminating the user information included in the message and replacing the user information with random ID, and generating the anonymous message by adding anonymous ID corresponding to the random ID.

In the transmitting operation, the anonymous message may be transmitted to the external terminal device designated by the user of the terminal device or be transmitted to the external terminal device in a multicast method.

When the terminal device is in the second anonymous transmission mode, the generating operation may include eliminating the user information included in the message, dividing the message into a plurality of segments and encoding the segments, and generating the anonymous message by mixing the encoded segments.

In the transmitting operation, when a predetermined command is input by the user of the terminal device, the server may decode the encoded anonymous message and transmit the decoded anonymous message to the terminal device.

The method may further include at the server, permanently eliminating the encoded anonymous message when a predetermined period of time has elapsed or when an elimination command is input by the user.

Exemplary embodiments of the present inventive concept may also provide a message transmission system including a terminal device configured to transmit a message created by a user to a server when a terminal device is set to an anonymous transmission mode and receives a message transmission command from the user, the server configured to generate an anonymous message by eliminating user information included in the transmitted message and to transmit the anonymous message to an external terminal device.

The terminal device may divide the message into a plurality of segments and transmit the segments to the server over a plurality of paths, and the server may restore the segments of the message transmitted over the plurality of paths.

The terminal device may encode each of the segments and transmit the encoded segments to the server, and the server may decode each of the encoded segments and restore the decoded segments to the message.

When a predetermined user command is input the terminal device displays a user interface (UI) to set a message transmission mode, and when a user command to change the message transmission mode into the anonymous transmission mode is input through the UI, the terminal device may change the message transmission mode of the terminal device into the anonymous transmission mode.

The anonymous transmission mode may include a first anonymous transmission mode to transmit the message to the external terminal device using anonymous identification (ID), and a second anonymous transmission mode to transmit the message back to the terminal device using the anonymous ID.

When the terminal device is in the first anonymous transmission mode, the server may generate the anonymous message by eliminating the user information included in the message, replacing the user information with random ID, and adding anonymous ID corresponding to the random ID.

The server may transmit the anonymous message to the external terminal device designated by the user of the terminal device or transmit the anonymous message to the external terminal device in a multicast method.

When the terminal device is in the second anonymous transmission mode, the server may generate the anonymous message by eliminating the user information included in the message, dividing the message into a plurality of segments, encoding the segments, and mixing the encoded segments.

When a predetermined command is input by the user of the terminal device, the server may decode the encoded anonymous message and transmit the decoded anonymous message to the terminal device.

When a predetermined period of time has elapsed, or when an elimination command is input by the user, the server may permanently eliminate the encoded anonymous message.

Exemplary embodiments of the present inventive concept may also provide a server including a communicator configured to receive a message created to transmit anonymously from a terminal device, and a controller configured to generate an anonymous message by eliminating user information included in the message and to control the communicator to transmit the anonymous message to an external terminal device.

Exemplary embodiments of the present inventive concept may also provide a terminal device including a communicator configured to communicate with a server, and a controller configured to control the communicator to transmit a message created by a user to a server together with information regarding an anonymous transmission mode so that the server eliminates user information included in the message, generates an anonymous message, and externally transmits the anonymous message when the terminal device is set to an anonymous transmission mode and receives a message transmission command from a user.

Exemplary embodiments of the present inventive concept may also provide a method of managing messages at a server, the method comprising: receiving, at a communicator, a message created externally to be transmitted according to information included with the message; and generating an anonymous message by eliminating user information included in the message and controlling the communicator to transmit the anonymous message to an external terminal device when the information received includes anonymous status information.

In an exemplary embodiment, the information in the received message is input by a user at an external device.

Exemplary embodiments of the present inventive concept may also provide a method of managing messages at a terminal device, the method comprising: receiving an input by a user corresponding to an anonymous transmission mode; and controlling a communicator to transmit a message created by the user to a server, the message including information regarding an anonymous transmission mode to instruct the server to eliminate user information included in the message.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
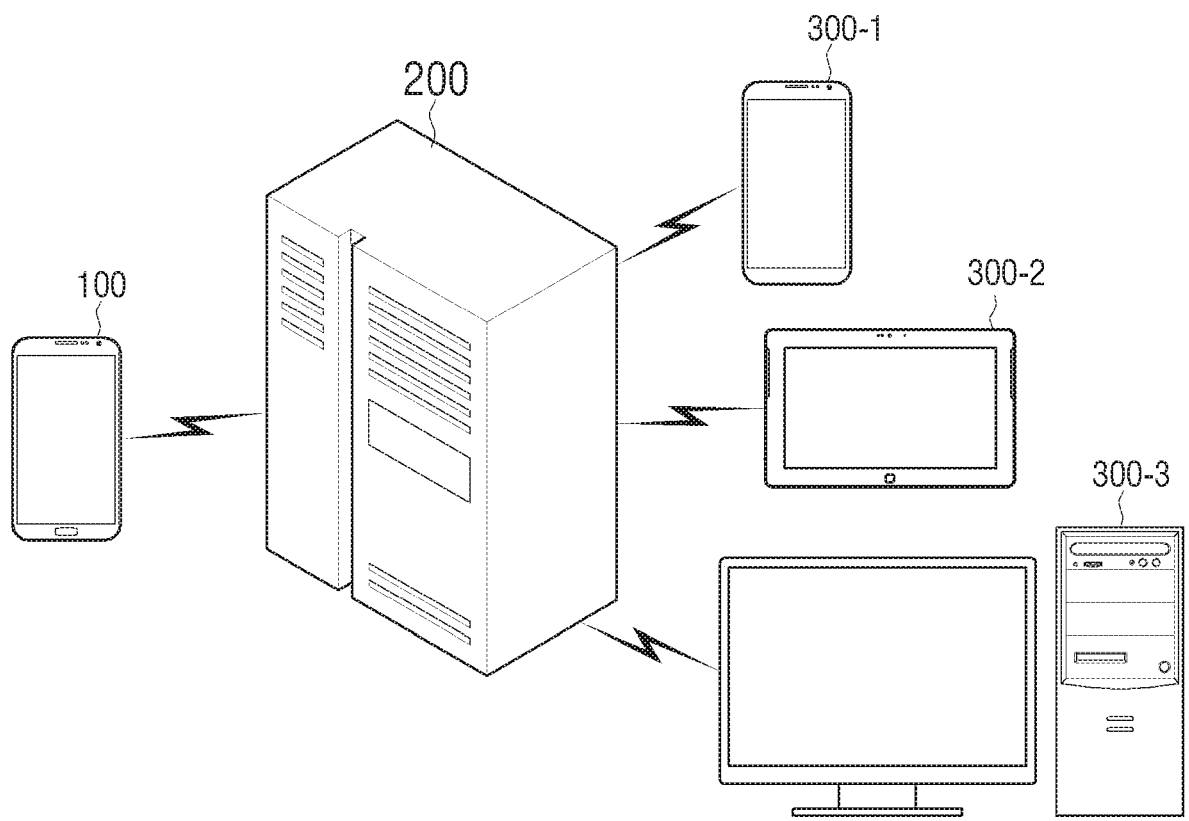
FIG. 1 shows a message transmission system according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present inventive concept can be carried out without those specifically defined matters. Also, well-known functions or constructions are not described in detail since they would obscure the inventive concept with unnecessary detail.

FIG. 1 shows a message transmission system 10 according to an exemplary embodiment of the present inventive concept. The message transmission system 10 may include a terminal device 100, a server 200, and a plurality of external terminal devices 300-1, 300-2, and 300-3 . . . 300-n. The terminal device 100 may be implemented with a smart phone, but this is merely an exemplary embodiment. Instead, the terminal device 100 may be implemented with diverse electronic devices such as a tablet personal computer (PC), a notebook PC, a mobile phone, a desktop PC, and a smart television (TV).

Above all, the terminal device 100 maintains an anonymous transmission mode to transmit a message. The anonymous transmission mode is a mode to transmit a message anonymously, including a first anonymous transmission mode and a second anonymous transmission mode. More specifically, the first anonymous transmission mode may be a mode to transmit a message to an external terminal device 300-1, 300-2, or 300-3 using anonymous identification (ID), and the second anonymous transmission mode may be a mode to transmit a message back to the terminal device 100 using anonymous ID. The terminal device 100 may set the anonymous transmission mode over a message transmission mode setting user interface (UI).

While maintaining the anonymous transmission mode, the terminal device 100 receives a message created by the user.

In addition, the terminal device 100 transmits the created message to the external server 200. The terminal device 100 may divide the message into a plurality of segments, encode the divided segments, and transmit the encoded segments to the server 200 over a plurality of paths, respectively.

When the encoded segments are received, the server 200 decodes the encoded segments, and restores the decoded segments to the message created by the user.

In addition, the server 200 eliminates data related to user information from among data included in the restored message. The data related to the user information may include at least one of a user ID, a user name, the time at which the user created the message, and the user's location. In particular, the server 200 may replace the user ID with a random ID.

Eliminating the data related to the user information by the server 200 is merely an exemplary embodiment. It is also possible to separate the data related to the user information and store the data in a separate area.

In addition, the server 200 may process the message from which the user information is eliminated differently according to the anonymous transmission mode.

More specifically, when the terminal device 100 transmits a message in the first anonymous transmission mode, the server 200 may generate an anonymous message by adding a new anonymous ID to the message from which user information is eliminated. In addition, the server 200 may transmit the anonymous message added with the new anonymous ID to at least one of the external terminal devices 300-1, 300-2, and 300-3. At this time, the server 200 may transmit the anonymous message to a terminal device designated by the user of the terminal device 100, and transmit the anonymous message in a multicast method.

When the terminal device 100 transmits a message in the second anonymous transmission mode, the server 200 may generate an anonymous message by dividing the message from which user information is eliminated into a plurality of segments again and mixing the segments. At this time, the server 200 may encode the segments in order to prevent hacking. Subsequently, when receiving an anonymous message transmission request from the terminal device 100, the server 200 may restore the anonymous message to an original message and transmit the original message to the terminal device 100. In addition, when the server 200 receives an anonymous message elimination request from the terminal device 100 or when a predetermined period of time has elapsed, the server 200 eliminates the anonymous message permanently. In particular, the server 200 may eliminate user information as well as the text of the message.

The message transmission system 10 as described above supports a privacy protection function for the message providing service, thereby providing diverse user experiences.

Figure 2:
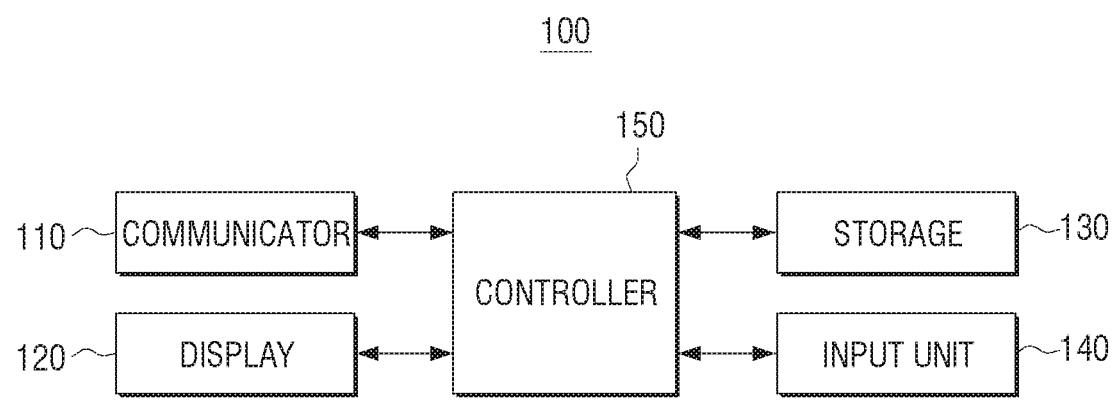
FIG. 2 is a block diagram of a configuration of a terminal device according to an exemplary embodiment of the present inventive concept.

FIG. 2 is a simple block diagram of a configuration of the terminal device 100 according to an exemplary embodiment of the present inventive concept. As shown in FIG. 2, the terminal device 100 may include a communicator 110, a display 120, a storage 130, an input unit 140, and a controller 150.

In FIG. 2, the components of the terminal device 100 are shown, for example, when the terminal device 100 is a device having diverse functions such as a communication function, a message transmission function, and a display function. Accordingly, according to exemplary embodiments, a portion of the components shown in FIG. 2 may be deleted or changed, or other components may be further added.

The communicator 110 communicates with diverse types of external devices according to diverse types of communication methods. The communicator 110 may include diverse communication chips such as a wireless fidelity (Wi-Fi) chip, a Bluetooth chip, a near field communication (NFC) chip, and wireless communication chip. The Wi-Fi chip, the Bluetooth chip, and the NFC chip perform communication in Wi-Fi method, Bluetooth method, and NFC method, respectively. The NFC chip is a chip that operates in the NFC method which uses a 13.56 MHz band among diverse radio frequency identification (RFID) frequency bands such as 135 kHz, 13.56 MHz, 433 MHz, 860-960 MHz, and 2.45 GHz. In the case of using the Wi-Fi chip or the Bluetooth chip, diverse connection information such as a subsystem identification (SSID) and a session key are transmitted and received first, and then after communication is connected, diverse information can be transmitted and received. The wireless communication chip is a chip that performs communication according to diverse communication standards such as IEEE, Zigbee, $3^{rd}$ generation (3G), $3^{rd}$ generation partnership project (3GPP), and long term evolution (LTE).

In particular, the communicator 110 communicates with the external server 200. The communicator 110 may transmit a plurality of segments encoded by control of the controller 150 to the server 200 over a plurality of transmission paths.

Figure 3:
FIG. 3 shows a UI to set a message transmission mode of the terminal device according to an exemplary embodiment of the present inventive concept.

The display 120 outputs image data by control of the controller 150. In particular, the display 120 may display a mode setting UI 310 to set a message transmission mode as shown in FIG. 3. The mode setting UI 310 to set the message transmission mode may be described in more detail later.

The storage 130 stores diverse modules to drive the terminal device 100. For example, the storage 130 may include software including a base module, a sensing module, a communication module, a presentation module, a web browser module, and a service module. The base module is a basic module that processes a signal transmitted from hardware included in the terminal device 100 and transmits the signal to an upper layer module. The sensing module is a module that collects information from diverse sensors and analyzes and manages the collected information, including a face recognition module, a voice recognition module, a motion recognition module, a NFC recognition module, and so on. The presentation module is a module that composes a display screen, including a multimedia module to play back and output multimedia content and a user interface (UI) rendering module to process UIs and graphics. The communication module is a module that communicates with external devices. The web browser module is a module that performs web browsing and accesses a web server. The service module is a module that includes diverse applications to provide diverse services.

The storage 130 may include the diverse program modules as described above, but according to the type and property of the terminal device 100, a portion of the diverse program modules may be omitted or changed, and other program modules may be added. For example, when the terminal device 100 is a tablet PC, the base module may further include a position determination module to determine a position based on a global positioning system (GPS), and the sensing module may further include a sensing module to sense the user's gesture.

The input unit 140 receives user commands to control the terminal device 100. In particular, the input unit 140 may receive a user command to set the message transmission mode.

The input unit 140 may be implemented with a touch panel, but this is merely an exemplary embodiment. The input unit 140 may be implemented with diverse input devices such as a pointing device, a voice recognition module, a motion recognition module, a mouse, and a keyboard.

The controller 150 controls the overall operation of the terminal device 100 according to a user command input over the input unit 140.

More specifically, the controller 150 may control the display 120 to display a UI to set the message transmission mode of the terminal device 100 according to a user command. For example, the controller 150 may control the display 120 to display the mode setting UI 310 as shown in FIG. 3. With reference to FIG. 3, in the mode setting UI 310, a normal transmission mode (Normal) or an anonymous transmission mode (Safe) may be set using a slide button. In addition, in the mode setting UI 310, a transmission channel may be set using a radio button. The transmission channel may include a normal transmission channel (N), a normal random transmission channel (N.R), an anonymous broadcasting channel (S.M), and an anonymous random transmission channel (S.R). The normal transmission channel (N) may transmit a normal message to a terminal device designated by the user, the normal random transmission channel (N.R) may transmit a normal message at random, the anonymous broadcasting channel (S.M) may transmit an anonymous message in the multicast method, and the anonymous random transmission channel (S.R) may transmit an anonymous message at random.

However, setting the message transmission mode using the slide button as shown in FIG. 3 is merely an exemplary embodiment. It is also possible to set the message transmission mode using diverse UIs such as a radio button and a check box. In addition, setting the anonymous transmission mode using the mode setting UI as shown in FIG. 3 is merely an exemplary embodiment. It is also possible to transmit a message in the anonymous transmission mode by adding predetermined text (for example, #SAFE, #SECRET, #BLACKHOLE, etc) when creating the message, by sensing a predetermined gesture (for example, a gesture of touching a screen with a thumb, a gesture of throwing the device, etc) when transmitting the message, or by sensing a predetermined user voice (for example, SAFE, SECRET, etc) when creating the message.

The controller 150 may transmit a message in a difference method according to the message transmission mode. More specifically, in the normal transmission mode, when a message is created and a message transmission request is input over the input unit 140, the controller 150 may transmit the normal message to the server 200.

However, in the anonymous transmission mode, when a message is created and a message transmission request is input over the input unit 140, the controller 150 may control the communicator 110 to transmit the created message to the server 200. In particular, the controller 150 may control the communicator 110 to transmit the created message including information regarding the anonymous transmission mode to the server 200 so that the server 200 may eliminate user information included in the created message, generate an anonymous message, and transmit the anonymous message externally.

At this time, the controller 150 may divide the created message into a plurality of segments. In addition, the controller 150 may mix the order of the segments and encode the segments so as to prevent hacking. In addition, the controller 150 may control the communicator 110 to transmit the encoded segments over a plurality of transmission paths. If the controller 150 divides the message into N segments, the controller 150 may control the communicator 110 to transmit the N segments over N transmission paths. When any segment is not received within a predetermined period of time or is lost while being transmitted over the N transmission paths, the server 200 may request retransmission of the segments from the terminal device 100.

In addition, when a transmission request is input by the user while an anonymous message transmitted in the second anonymous transmission mode is stored in the server 200, the controller 150 may transmit a request to transmit the stored anonymous message to the server 200 and control the communicator 110 to receive the anonymous message from the server 200. In addition, when an elimination request is input by the user while an anonymous message transmitted in the second anonymous transmission mode is stored in the server 200, the controller 150 may control the communicator 110 to request elimination of the stored anonymous message from the server 200.

In addition, when a message is transmitted, the controller 150 may control the display 120 to display the transmitted message.

Figure 4:
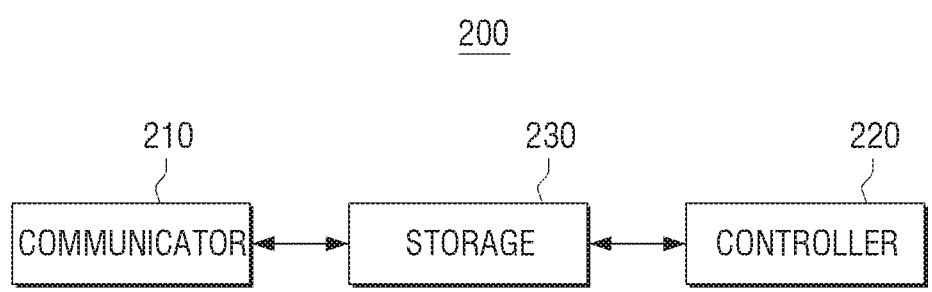
FIG. 4 is a block diagram of a configuration of a server according to an exemplary embodiment of the present inventive concept.

FIG. 4 is a simple block diagram of a configuration of the server 200 according to an exemplary embodiment of the present inventive concept. With reference to FIG. 4, the server 200 may include a communicator 210, a storage 230, and a controller 220.

The communicator 210 may communicate with the terminal devices 100 and 300 in diverse communication methods. In particular, the communicator 210 may receive a plurality of encoded segments from the terminal device 100 over a plurality of paths. In addition, the communicator 210 may transmit an anonymous message from which user information is eliminated to the external terminal device 300.

The storage 230 may store diverse data and programs to control the server 200. In addition, the storage 230 may store an anonymous message transmitted in the second anonymous transmission mode.

The controller 220 may control the overall operation of the server 200. In particular, when a plurality of encoded segments are received from the terminal device 100, the server 200 may decode each of the encoded segments. Subsequently, the server 200 may restore the decoded segments in the order of the original message created by the user. Among the segments received from the terminal device 100, if there is any segment which is not received within a predetermined period of time or if there is any lost segment(s), the controller 220 may request retransmission of the segment(s) which is not received from the terminal device 100.

In addition, the controller 220 may eliminate user information from the restored message. More specifically, the controller 220 may eliminate user information such as a user ID, a user name, the time at which the message is created, and a location, and replace the user ID with a random ID.

At this time, the controller 220 may eliminate the user information from the restored message, but this is merely an exemplary embodiment. It is also possible to separate the user information from the restored message and store the user information in a separate area.

In addition, the controller 220 may process the message from which the user information is eliminated in different methods according to the anonymous transmission mode.

When a message is transmitted in the first anonymous transmission mode, the controller 220 may generate an anonymous message by adding an anonymous ID to the message from which user information is eliminated, and store the anonymous message. More specifically, the controller 220 may add the anonymous ID using random ID information added to the message. In other words, since the controller 220 may add an anonymous ID corresponding to a random ID, the controller 220 may add the same anonymous ID to a message having the same user ID. Accordingly, since the server 200 knows the relationship among a user ID, a random ID, and an anonymous ID, the server 200 may identify a user ID which transmits spam messages or acts as malware, and thus control malicious use.

In addition, the controller 220 may control the communicator 210 to transmit an anonymous message added with anonymous ID to at least one external terminal device 300 over a channel selected by the user. In particular, when the controller 220 determines that effectiveness of anonymity is low due to a small number of the terminal devices 300 designated by the user, the controller 220 may inform the terminal device 100 of the situation or recommend other users.

When a message is transmitted in the second anonymous transmission mode, the controller 220 may generate an anonymous message by dividing the message from which user information is eliminated into a plurality of segments again and mixing the segments at random, and may store the generated anonymous message in the storage 230. At this time, in order to enhance security, the controller 220 may encode and mix the segments and store the anonymous message in the storage 230.

Subsequently, when a transmission request is received from the terminal device 100, the controller 220 may perform authentication to determine whether the user of the terminal device 100 is identical to the user who created the message. When the user of the terminal device 100 is determined to be identical to the user who created the message, the controller 220 may decode the anonymous message stored in the storage 230, restore the anonymous message in the order of the original message created by the user, and control the communicator 210 to transmit the restored message to the terminal device 100.

In addition, when an elimination request is received from the terminal device 100, the controller 220 may perform authentication to determine whether the user of the terminal device 100 is identical to the user who created the message. When the user of the terminal device 100 is determined to be identical to the user who created the message, the controller 220 may eliminate the anonymous message stored in the storage 230 permanently. At this time, if user information has been stored in the separate area, the controller 220 may also eliminate the user information permanently.

In addition, when a predetermined period of time has elapsed, the controller 220 may eliminate the anonymous message stored in the storage 230. That is, the controller 220 may count a time from a point of time when the anonymous message is stored, and permanently eliminate the anonymous message from the storage 230 after a lapse of the predetermined period of time. At this time, if user information has been stored in the separate area, the controller 220 may also eliminate the user information permanently.

Due to the server 100 as described above, the user may be provided with message transmission service capable of guaranteeing anonymity.

An anonymous message transmission method according to an exemplary embodiment of the present inventive concept is described with reference to FIGS. 5 to 7.

Figure 5:
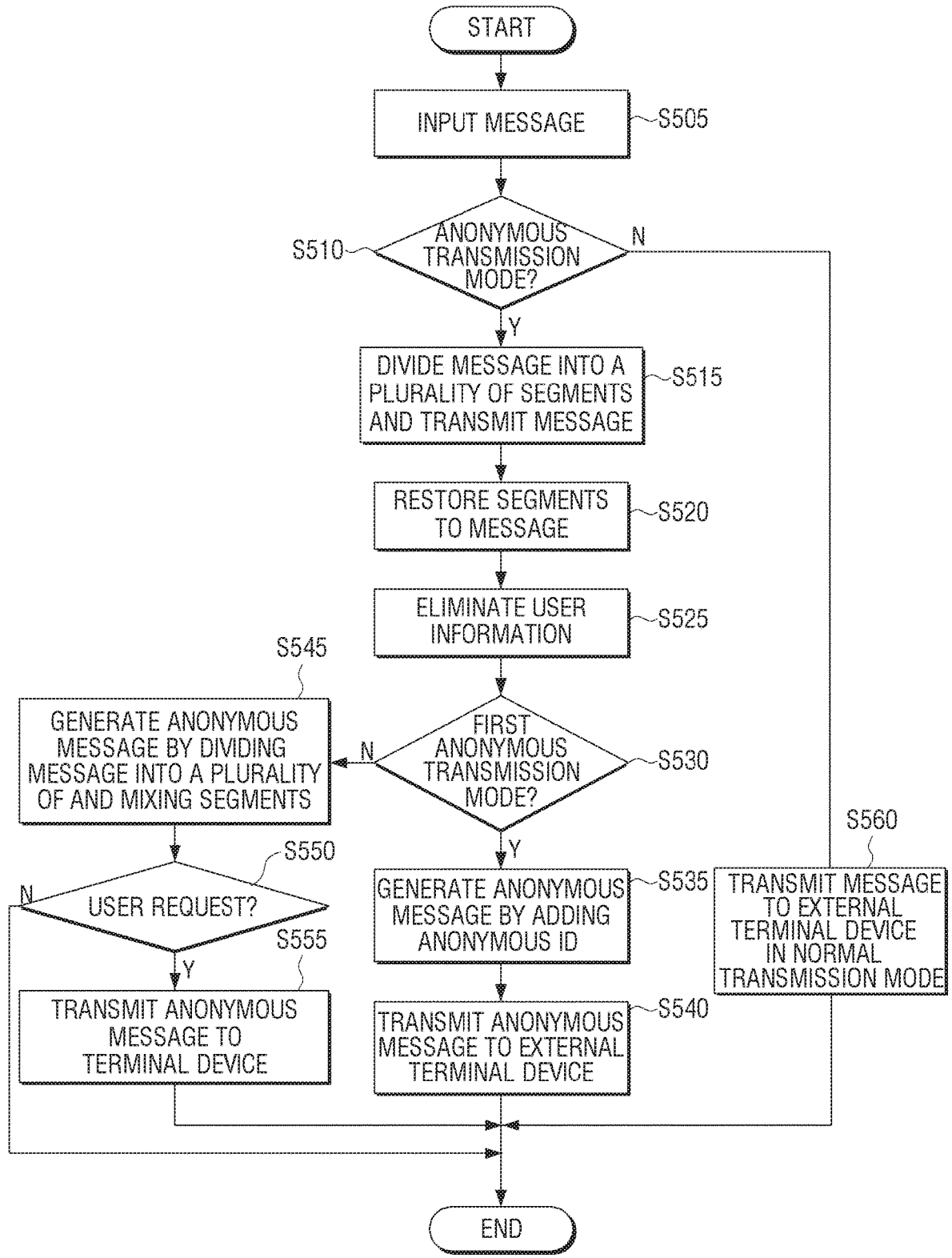
FIG. 5 is a flowchart of a message transmission method of a message transmission system according to an exemplary embodiment of the present inventive concept.

FIG. 5 is a flowchart of a message transmission method of the message transmission system 10 according to an exemplary embodiment of the present inventive concept.

In operation S505, the terminal device 100 receives input of a message by the user.

In operation S510, the terminal device 100 determines whether the message transmission mode of the terminal apparatus 100 is currently set as the anonymous transmission mode.

When the terminal device 100 is determined not to be set in the anonymous transmission mode but in the normal transmission mode in operation S510-N, the terminal device 100 transmits the message created by the user to the external terminal device 300 in the normal transmission mode in operation S560.

However, when the terminal device 100 is determined to be in the anonymous transmission mode in operation S510-Y, the terminal device 100 divides the message into a plurality of segments and transmits the message to the server 200 in operation S515. At this time, each of the segments may be encoded.

In operation S520, the server 200 restores the plurality of segments to the message created by the user. When the segments have been encoded, the server 200 may decode the encoded segments and restore the decoded segments to the message created by the user.

In operation S525, the server 200 eliminates user information stored in the message. More specifically, the server 200 may eliminate user information such as a user ID, a user name, the time at which the message is created, a location, etc.

In operation S530, the server 200 determines whether the message is transmitted in the first anonymous transmission mode.

When the message is determined to be transmitted in the first anonymous transmission mode in operation S530-Y, the server 300 generates an anonymous message by adding an anonymous ID to the message from which the user information is eliminated in operation S535. In operation S540, the server 200 transmits the anonymous message to the external terminal apparatus 300.

However, when the message is transmitted in the second anonymous transmission mode in operation S530-N, the server 300 generates an anonymous message by dividing the message into a plurality of segments and mixing the segments in operation S545. Subsequently, when a user request is received from the terminal device 100 in operation S550-Y, the server 200 transmits the anonymous message to the terminal device 100 in operation S555.

Figure 6:
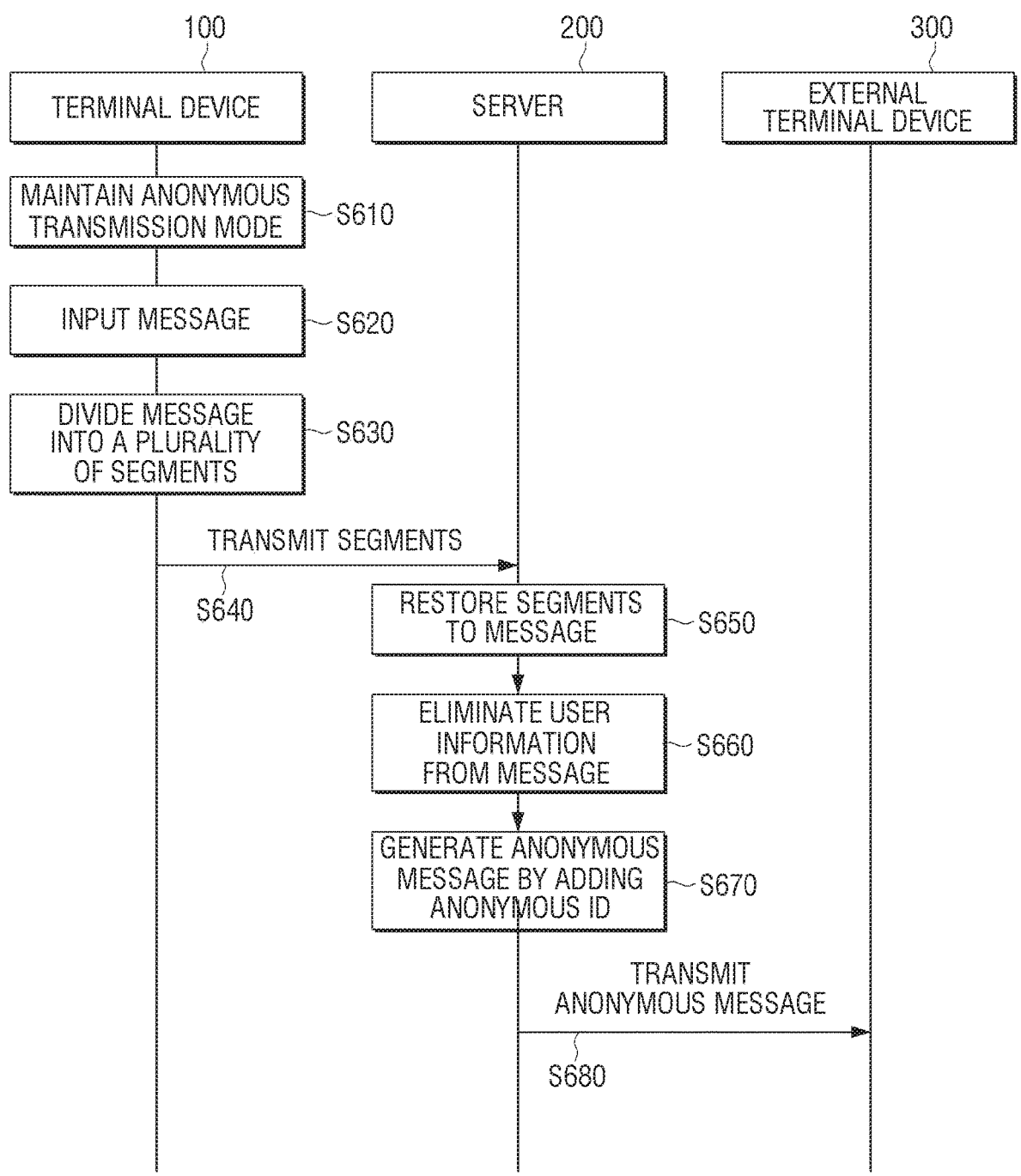
FIG. 6 is a sequence diagram showing an anonymous message transmission method of an message transmission system in a first anonymous transmission mode according to an exemplary embodiment of the present inventive concept.

FIG. 6 is a sequence diagram showing the anonymous message transmission method of the message transmission system 10 in the first anonymous transmission mode according to an exemplary embodiment of the present inventive concept.

In operation S610, the terminal device 100 maintains the anonymous transmission mode. The anonymous transmission mode may be a mode to transmit a message created by the user to the external terminal device 300 together with anonymous identification (ID).

In operation S620, the terminal device 100 receives input of a message by the user.

In operation S630, the terminal device 100 divides the input message into a plurality of segments. In order to enhance security, the terminal device 100 may encode each of the segments.

In operation S640, the terminal device 100 transmits the segments to the server 200. The terminal device 100 may transmit N segments to the server 200 over N transmission paths.

In operation S650, the server 200 restores the segments of the message. When each of the segments has been encoded, the server 200 may decode the encoded segments and restore the decoded segments of the original message.

In operation S660, the server 200 eliminates user information included in the message. The user information may be information that can imply the user, such as user ID, a user name, the time at which the user created the message, and the user's location.

In operation S670, the server 200 generates an anonymous message by adding an anonymous ID to the message from which the user information is eliminated. The server 200 may add the anonymous ID corresponding to the user ID.

In operation S680, the server 200 transmits the generated anonymous message to the external terminal device 300. The server 200 may transmit the anonymous message over a transmission channel set by the user.

Figure 7:
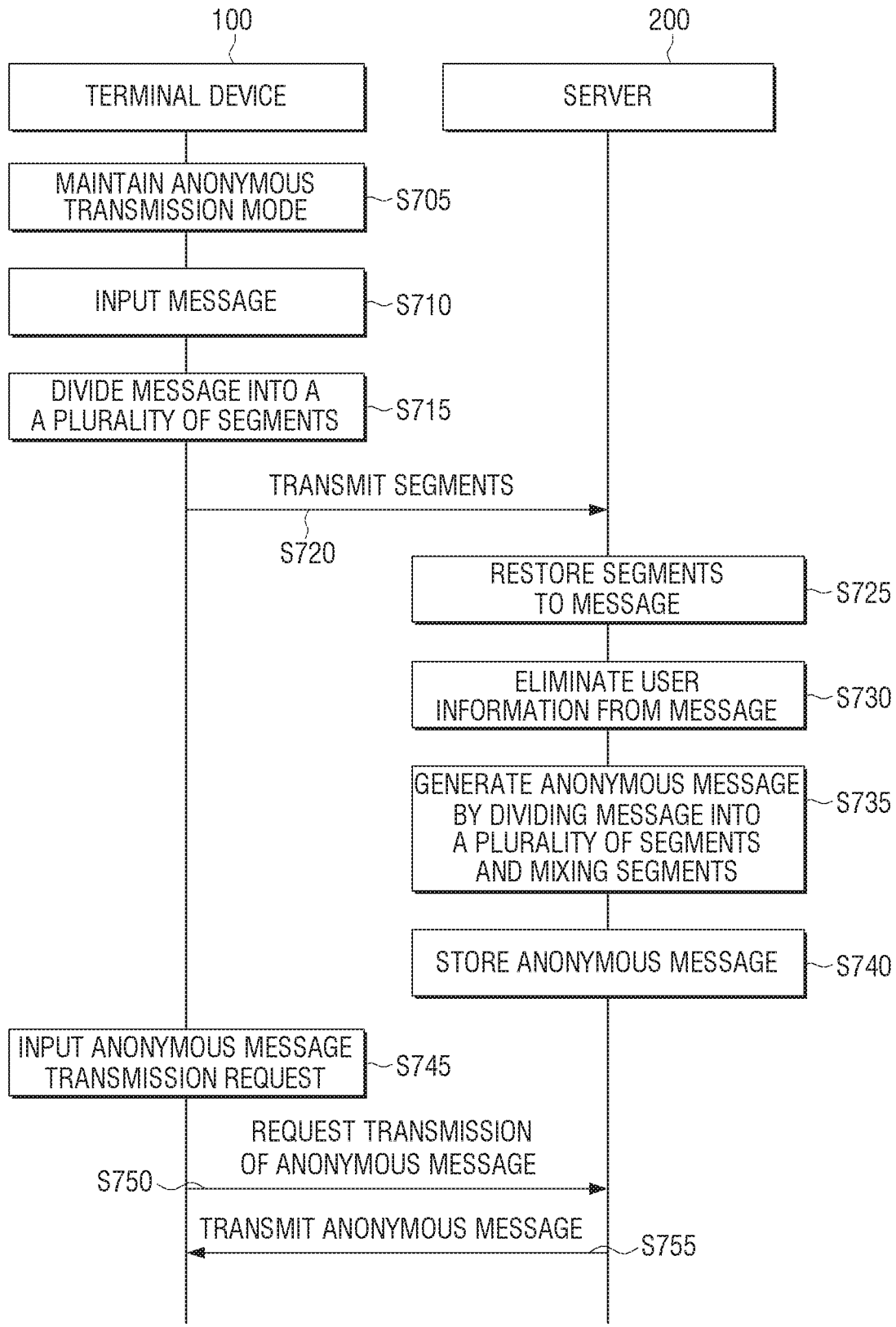
FIG. 7 is a sequence diagram showing an anonymous message transmission method of a message transmission system in a second anonymous transmission mode according to an exemplary embodiment of the present inventive concept.

FIG. 7 is a sequence diagram showing the anonymous message transmission method of the message transmission system 10 in the second anonymous transmission mode according to an exemplary embodiment of the present inventive concept.

In operation S705, the terminal device 100 maintains the anonymous transmission mode. The anonymous transmission mode may be a mode to transmit a message created by the user back to the terminal device 100 together with anonymous identification (ID).

In operation S710, the terminal device 100 receives input of a message by the user.

In operation S715, the terminal device 100 divides the input message into a plurality of segments. In order to enhance security, the terminal device 100 may also encode each of the segments.

In operation S720, the terminal device 100 transmits the segments to the server 200. The terminal device 100 may transmit N segments to the server 200 over N transmission paths.

In operation S725, the server 200 restores the segments of the message. When each of the segments has been encoded, the server 200 may also decode the encoded segments and restore the decoded segments in the order of the original message.

In operation S730, the server 200 eliminates user information included in the message. The user information may be information that can imply the user, such as user ID, a user name, the time at which the user created the message, and the user's location as described above.

In operation S735, the server 200 generates an anonymous message by dividing the message into a plurality of segments and mixing the segments. In order to enhance security, the server 200 may also encode each of the segments. In operation S740, the server 200 stores the anonymous message.

In operation S745, the terminal device 100 receives input of an anonymous message transmission request command.

When the terminal device 100 receives input of the anonymous message transmission request command, the terminal device 100 requests transmission of the anonymous message from the server 200 in operation S750, and the server 200 transmits the requested anonymous message to the terminal device 100 in operation S755. In order to transmit the requested anonymous message, the server 200 may decode the encoded segments, restore the decoded segments in the order of the original message, and transmit the restored message to the terminal device 100.

By the aforementioned anonymous message transmission method, the user may be provided with diverse user experiences using anonymous messages.

The anonymous message transmission methods of the message transmission system according to the diverse exemplary embodiments of the present inventive concept may be implemented with a program, and be provided to display devices. The program including the anonymous message transmission methods of the message transmission system may be stored in a non-transitory computer readable medium and be provided.

The non-transitory computer readable medium is a medium which does not store data temporarily such as a register, cash, and memory but stores data semi-permanently and is readable by electronic devices. More specifically, the aforementioned diverse applications or programs may be stored and provided in the non-transitory computer readable medium such as compact disks (CDs), digital video disks (DVDs), hard disks, Blu-ray disks, universal serial buses (USBs), memory cards, and read-only memory (ROM).

The foregoing exemplary embodiments of the present inventive features and utilities are merely exemplary and are not to be construed as limiting the present inventive concept. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. An anonymous message transmission method of a message transmission system, the method comprising:
    at a terminal device, displaying a user interface (UI) to set a message transmission mode when a predetermined user command is input;
    at the terminal device, setting the message transmission mode of the terminal device into an anonymous transmission mode when a user command to set the message transmission mode into the anonymous transmission mode is input through the UI;

at the terminal device, dividing a message created by a user into a plurality of segments and transmitting the plurality of segments to a server over a plurality of paths in response to a message transmission command being received from the user while the terminal device is set to the anonymous transmission mode;

at the server, in response to the plurality of segments being received from the terminal device, restoring the plurality of segments transmitted over the plurality of paths to the message, in response to the restoring, eliminating user information included in the message, in response to the eliminating, identifying the anonymous transmission mode, and generating an anonymous message based on the anonymous transmission mode; and at the server, transmitting the anonymous message to the terminal device or another terminal device, wherein in the transmitting the plurality of segments to the server, each of the plurality of segments is encrypted and is transmitted to the server, and in the restoring the plurality of segments, the server decrypts each of the plurality of encrypted segments and restores the decrypted segments of the message.

2. The method as claimed in claim 1, wherein the anonymous transmission mode set in the setting the message transmission mode is:

a first anonymous transmission mode to transmit the anonymous message to the another terminal device using anonymous identification (ID), or a second anonymous transmission mode to transmit the anonymous message back to the terminal device using the anonymous ID.

3. The method as claimed in claim 2, wherein the anonymous transmission mode set in the setting the message transmission mode is the first anonymous transmission mode, and the eliminating comprises:

eliminating the user information included in the message and replacing the user information with random ID; and generating the anonymous message by adding anonymous ID corresponding to the random ID.

4. The method as claimed in claim 3, wherein in the transmitting operation, the anonymous message is transmitted to the another terminal device designated by the user of the terminal device or is transmitted to the another terminal device in a multicast method.

5. The method as claimed in claim 2, wherein the anonymous transmission mode set in the setting the message transmission mode is the second anonymous transmission mode, and the eliminating comprises:

eliminating the user information included in the message;

dividing the message into a second plurality of segments and encrypting the second plurality of segments; and mixing the encrypted segments.

6. The method as claimed in claim 5, wherein in the transmitting operation, when a predetermined command is input by the user of the terminal device, the server decrypts the encrypted anonymous message and transmits the decrypted anonymous message to the terminal device.

7. The method as claimed in claim 5, further comprising:

at the server, permanently eliminating the encrypted anonymous message when a predetermined period of time has elapsed, or when an elimination command is input by the user.

8. The method as claimed in claim 1, wherein, in the transmitting the anonymous message, the anonymous message is transmitted to the another terminal device.

9. A message transmission system comprising:

a terminal device comprising at least one memory storing instructions, and at least one processor that executes the instructions to cause the terminal device to perform displaying a user interface (UI) to set a message transmission mode when a predetermined user command is input, setting the message transmission mode of the terminal device into an anonymous transmission mode when a user command to set the message transmission mode into the anonymous transmission mode is input through the UI, and dividing a message created by a user into a plurality of segments and transmitting the segments to a server over a plurality of paths in response to a message transmission command being received from the user while the terminal device is set to the anonymous transmission mode; and the server, configured to, in response to the plurality of segments being received from the terminal device, restore the segments of the message transmitted over the plurality of paths, in response to the restoring, eliminate user information included in the message, in response to the eliminating, identify the anonymous transmission mode, generate an anonymous message based on the anonymous transmission mode, and transmit the anonymous message to the terminal device or another terminal device, wherein the at least one processor executes the instructions to cause the terminal device to encrypt each of the plurality of segments and transmit the encrypted segments to the server, and the server decrypts each of the encrypted segments, and restores the decrypted segments of the message.

10. The system as claimed in claim 9, wherein, the terminal device is settable to, as the anonymous transmission mode:

a first anonymous transmission mode to transmit the anonymous message to the another terminal device using anonymous identification (ID), and a second anonymous transmission mode to transmit the anonymous message back to the terminal device using the anonymous ID.

11. The system as claimed in claim 10, wherein when the terminal device is in the first anonymous transmission mode, the server eliminates the anonymous message by eliminating the user information included in the message, replacing the user information with random ID, and adding anonymous ID corresponding to the random ID.

12. The system as claimed in claim 11, wherein the server transmits the anonymous message to the another terminal device designated by the user of the terminal device or transmits the anonymous message to the another terminal device in a multicast method.

13. The system as claimed in claim 10, wherein when the terminal device is in the second anonymous transmission mode, the server eliminates the anonymous message by eliminating the user information included in the message, dividing the message into a plurality of segments, encrypting the segments, and mixing the encrypted segments.

14. The system as claimed in claim 13, wherein when a predetermined command is input by the user of the terminal device, the server decrypts the encrypted anonymous message and transmits the decrypted anonymous message to the terminal device.

15. The system as claimed in claim 13, wherein when a predetermined period of time has elapsed, or when an elimination command is input by the user, the server permanently eliminates the encrypted anonymous message.

16. The system as claimed in claim 9, wherein the server transmits the anonymous message to the another terminal device.

17. A server comprising:
a communicator;
at least one memory storing instructions; and
at least one processor that executes the instructions to cause the server to:
receive, from a terminal device, a message including information to be transmitted anonymously, the message having been obtained and transmitted to the server by
displaying, at the terminal device, a user interface (UI) to set a message transmission mode when a predetermined user command is input;
setting, at the terminal device, the message transmission mode of the terminal device into an anonymous transmission mode when a user command to set the message transmission mode into the anonymous transmission mode is input through the UI; and
at the terminal device, dividing the message, created by a user, into a plurality of segments, encrypting the plurality of segments, and transmitting the encrypted plurality of segments from the terminal device to the server over a plurality of paths in response to the terminal device receiving a message transmission command from the user while the terminal device is set to the anonymous transmission mode;
in response to the plurality of segments being received from the terminal device, decrypt each of the encrypted plurality of segments and restore the plurality of segments transmitted over the plurality of paths to the message;
in response to the restoring, eliminate user information included in the message;
in response to the eliminating, identify the anonymous transmission mode;
generate an anonymous message based on the anonymous transmission mode; and
control the communicator to transmit the anonymous message to another terminal device.

18. A terminal device comprising:
at least one memory storing instructions; and
at least one processor that executes the instructions to cause the terminal device to
display a user interface (UI) to set a message transmission mode when a predetermined user command is input,
set the message transmission mode of the terminal device into an anonymous transmission mode when a user command to set the message transmission mode into the anonymous transmission mode is input through the UI, and
in response to a message transmission command being received from the user while the terminal device is set to the anonymous transmission mode, divide a message created by a user into a plurality of segments, encrypt the plurality of segments, and transmit the encrypted plurality of segments to a server over a plurality of paths, so that the server, in response to the plurality of segments being received from the terminal device, decrypts each of the encrypted plurality of segments and restores the plurality of segments transmitted over the plurality of paths to the message, in response to the restoring, eliminates user information included in the message, in response to the eliminating, identifies the anonymous transmission mode, generates an anonymous message, and transmits the anonymous message to another terminal device.

19. A method of managing messages at a server, the method comprising:
receiving, from a terminal device, a message created to be transmitted according to information included with the message, the message having been obtained and transmitted to the server by
displaying, at the terminal device, a user interface (UI) to set a message transmission mode when a predetermined user command is input;
setting, at the terminal device, the message transmission mode of the terminal device into an anonymous transmission mode when a user command to set the message transmission mode into the anonymous transmission mode is input through the UI; and
at the terminal device, dividing the message, created by a user, into a plurality of segments, encrypting the plurality of segments, and transmitting the encrypted plurality of segments from the terminal device to the server over a plurality of paths in response to the terminal device receiving a message transmission command from the user while the terminal device is set to the anonymous transmission mode; and
in response to the plurality of segments being received from the terminal device, decrypting each of the encrypted plurality of segments and restoring the plurality of segments transmitted over the plurality of paths to the message, in response to the restoring, eliminating user information included in the message, in response to the eliminating, identifying the anonymous transmission mode, generating an anonymous message based on the anonymous transmission mode, and transmitting the anonymous message to another terminal device when the information received includes anonymous status information.

20. The method of claim 19, wherein the information in the received message is input by a user at the terminal device.

21. A method of managing messages at a terminal device, the method comprising:
displaying a user interface (UI) to set a message transmission mode when a predetermined user command is input; receiving, through the UI, an input by a user corresponding to an anonymous transmission mode;
in response to the receiving the input through the UI, setting the message transmission mode of the terminal device into the anonymous transmission mode; and
in response to a message transmission command being received from the user while the terminal device is set to the anonymous transmission mode, dividing a message created by the user into a plurality of segments, encrypting the plurality of segments, and transmitting the encrypted plurality of segments to a server over a plurality of paths, to instruct the server to, in response to the plurality of segments being received from the terminal device, decrypt each of the encrypted plurality of segments and restore the plurality of segments transmitted over the plurality of paths to the message, in response to the restoring, eliminate user information included in the message, and in response to the eliminating, identify the anonymous transmission mode.

* * * * *